Aug. 4, 1931.  A. WINTHER ET AL  1,817,660

TRANSMISSION

Filed Nov. 6, 1929  3 Sheets-Sheet 1

Anthony Winther,
Martin P. Winther,
Inventors
Delos G. Haynes
Attorney

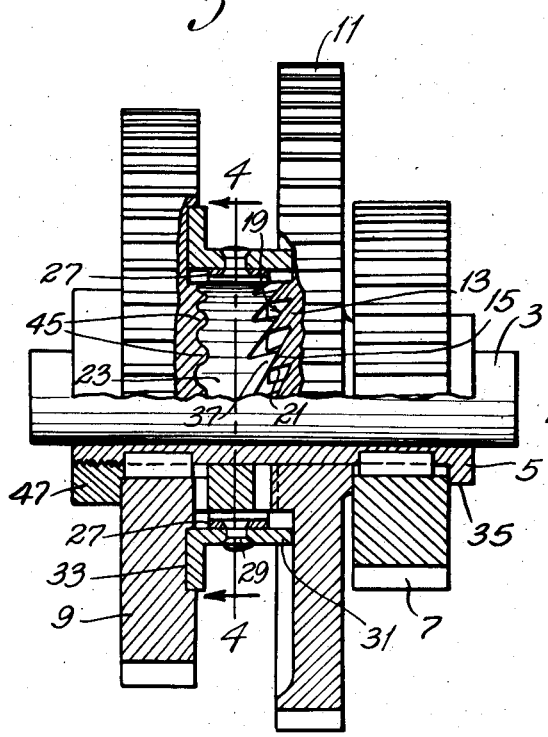
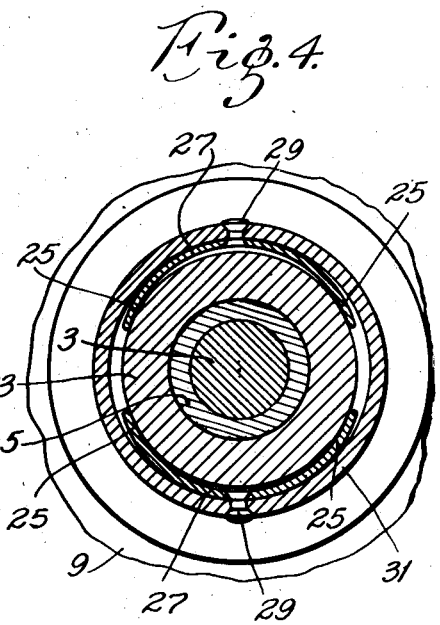
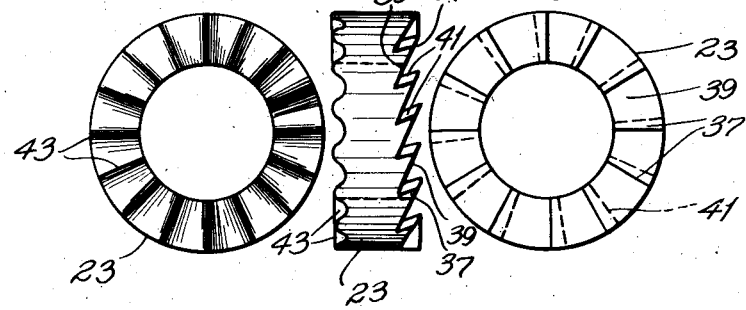

Aug. 4, 1931.  A. WINTHER ET AL  1,817,660
TRANSMISSION
Filed Nov. 6, 1929  3 Sheets-Sheet 3
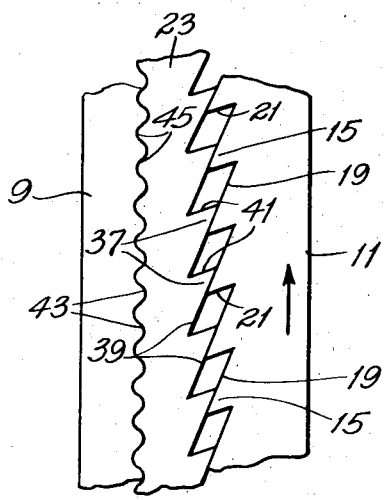
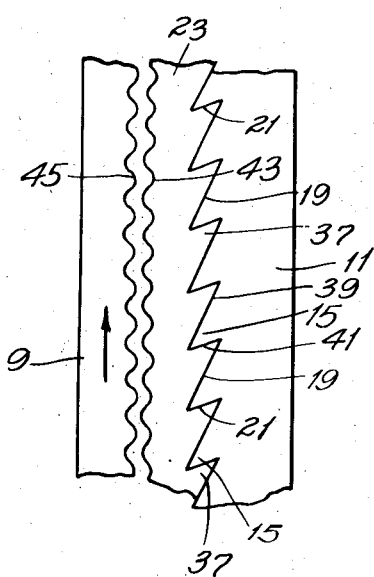
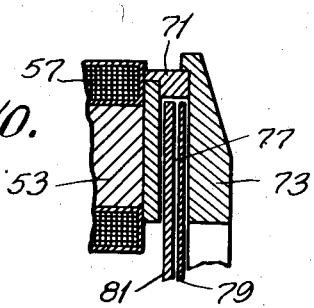

Patented Aug. 4, 1931

1,817,660

UNITED STATES PATENT OFFICE

ANTHONY WINTHER, OF KENOSHA, WISCONSIN, AND MARTIN PHILLIP WINTHER, OF WAUKEGAN, ILLINOIS, ASSIGNORS TO THE WINTHER COMPANY, OF WILMINGTON, DELAWARE, A CORPORATION OF DELAWARE

TRANSMISSION

Application filed November 6, 1929. Serial No. 405,095.

This invention relates to transmissions, and with regard to certain more specific features, to a transmission for translating energy.

Among the several objects of the invention may be noted the provision of an exceedingly simple but effective transmission for transmitting energy and translating torque from a prime mover to a point of application; the provision of a device of the class described which under conditions of acceleration will automatically adapt the relatively limited effective torque-speed range on a prime mover such as an internal combustion engine, to the relatively unlimited effective torque-speed range which may be expected in certain power applications, such for instance as is had at the driving wheels of an automotive vehicle; the provision of a device of the class described which does not introduce into the driving system members having excessive weights or high moments of inertia, thereby providing smooth operation; the provision of a device of the class described which includes only the simplest of electrical elements; and the provision of the class described which is light in total weight, small in bulk and which may be manufactured with economy. Other objects will be in part obvious and in part pointed out hereinafter.

The invention accordingly comprises the elements and combination of elements, features of construction, and arrangements of parts, which will be exemplified in the structure hereinafter described, and the scope of the application of which will be indicated in the following claims.

In the accompanying drawings in which are illustrated several of various possible embodiments of the invention.

Fig. 3 is an enlarged side elevation of a mechanical energy valve, certain portions being broken away;

Fig. 4 is a cross section taken on line 4—4 of Fig. 3;

Fig. 5 is a plan view of the left hand face of Fig. 6;

Fig. 6 is a side elevation of a clutch ring shown in Figs. 1 and 3;

Fig. 7 is a plan view of the right-hand side of Fig. 6, showing a wedging face;

Fig. 8 is a diagrammatic developed view, illustrating said clutch ring and its associated elements in closed position;

Fig. 9 is a view similar to Fig. 8 showing the clutch ring and its associated elements in open position; and, Fig. 10 is a fragmentary cross section showing an alternative form of certain parts illustrated in Fig. 1.

Similar reference characters indicate corresponding parts throughout the several views of the drawings.

Inasmuch as the mechanical valve assembly and parts illustrated in Figs. 3 to 9 comprise a novel element per se, and ordinarily would not be well understood, said valve will be first described in order that its use in connection with the herein described invention shall be clear.

Figure 1:
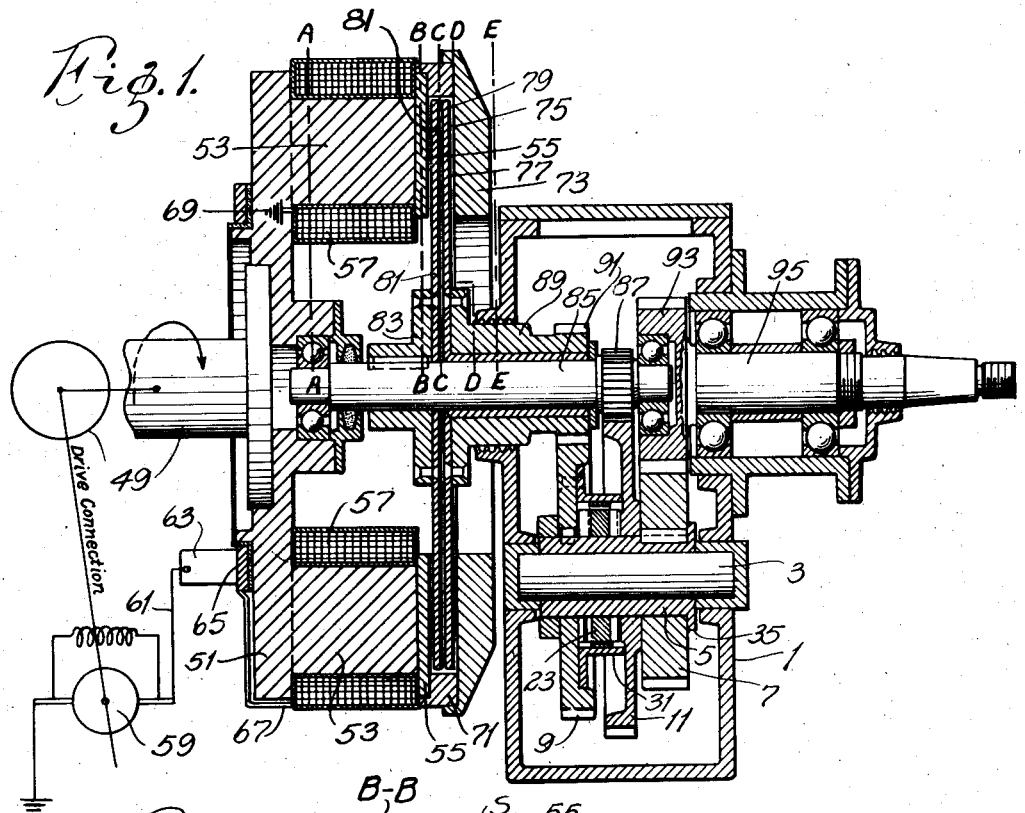
Fig. 1 is a longitudinal section illustrating the elements of the invention.

Referring first more particularly to Fig. 1, there is illustrated at numeral 1 a gear case in which is mounted a counter-shaft 3. This counter-shaft is also shown in Fig. 3. It carries rotatably thereon a sleeve 5, to which are keyed gears 7 and 9. Rotatably mounted on the sleeve 5 is a gear 11. Gear 11 is larger than gear 9 for the purpose of effecting certain speed changes to be hereinafter described. The size of the gear 7 is chosen so that certain final gear ratios are proper.

As will appear hereinafter, it is desirable that the gear 11 be adapted to drive the gear 7 through the sleeve 5 when said gear 11 is turned relatively faster than the gear 9, that is, when the gear 11 overruns gear 9 in a clockwise direction, viewing Fig. 3 from the right. On the other hand when the gear 11 lags behind gear 9, or stating the inverse proposition, when gear 9 overruns gear 11, then it is desirable that the gear 7 be driven from the gear 9 by way of sleeve 5 and not from the gear 11. The reasons for this will appear hereinafter.

In order to accomplish the above function, there is fastened to the gear 11 a crown member 13 (Fig. 3) provided with longitudinally arranged crown teeth 15. The extension of the teeth is longitudinal and their positioning is circular on the left-hand face of the gear 11. As indicated at Figs. 3, 8 and 9, each tooth 15 has a sloping face 19 and an under-cut back 21. The development (Fig. 8) shows this to best advantage.

Between the gears 9 and 11, there is rotatably mounted on the sleeve 5 a clutch ring or intermediate member 23. This member or ring 23 is also longitudinally slidable on said sleeve 5. However, the ring 23 is normally lightly constrained to move with the gear 9, because of the frictional engagement therewith of springs 27 at points 25 (see Fig. 4). The springs 27 are fastened by rivets 29 to a sleeve 31, said sleeve 31 being fastened to and rotatable with the gear 9 as indicated at numeral 33. It will be seen that the constraint by the springs 27 in moving the ring 23 is not positive, because the driving engagement is merely frictional.

The ring 23 per se is shown more particularly in Figs. 5 to 7. It will be seen to have an outer cylindrical surface with which the springs 27 contact, and an inner cylindrical surface for riding longitudinally and rotatably on the sleeve 5. At the side adjacent gear 11, the ring 23 is provided with teeth 37 of crown formation which have substantially the same shape as said teeth 15 of the gear 11, except that the teeth 37 are inverted in circular positioning. That is to say, the teeth 15 of the gear and 37 of the ring are complementary. Re the teeth 37, the backs 39 are sloped, as are the front portions 19 of the teeth 15; and the front portions 41 of teeth 37 are under cut, as are the back portions 21 of teeth 15.

The opposite face of the ring 23 which is adjacent the gear 9 is formed with radial convolutions 43 which are complementary to engaging convolutions 45 formed on the juxtaposed face of the gear 9. It will be understood that the convolutions 45 are formed with the gear 9 in a manner analogous to which the teeth 15 are formed with the gear 11, being circularly positioned.

From the above, it will be appreciated that the clutch ring 23 has longitudinal movement along the sleeve 5 of a magnitude, which, when the convolutions 43 and 45 are engaged, will not permit of the teeth 15, 37 clearing one another (Figs. 3 and 8). On the other hand, when said convolutions 43 and 45 are disengaged and the crown teeth 15, 37 are entirely engaged, then the allowable movement is enough that the convolutions are entirely separated and permit free relative motion between the clutch ring 23 and the sleeve 5 and gear 9. The operation, which is as follows, will clarify the relationship between parts.

Assume first that motion of the gear 7 is resisted and that a couple is applied to the gear 9 which couple is not adapted to pick up the load on gear 7, while that on gear 11 when aiding will enable the device to move the load. These conditions will result in the gear 11 overrunning the gear 9 in a clockwise direction (Fig. 3) until the couple of gear 11 aids that of gear 9.

The light friction at the contacts 25 between the springs 27 and the ring 23 results in the ring 23 tending to assume the movement which is that of the gear 9, that is, the ring 23 tends to remain stationary with respect to the gear 9, even though the gear 9 be rotating or stationary. Hence the desired relative rotation of the gear 11 will effect relative movement between the crown teeth 15 on said gear 11 and the clutch ring 23, so that there is effected a driving action between the sloping faces 19 and 39 (Figs. 3 and 8). This action effects a wedging of the clutch ring 23 away from the gear 11 and hence there is effected engagement between the convolutions 43 and 45 of the clutch ring and gear 9 respectively. Continued rotation of the gear 11 exerts increasing wedging action and thereby produces a positive lock between the gear 11, ring 23, and gear 9, and hence the rotation of the gear 9 will follow that of the gear 11. Inasmuch as the gear 9 is keyed to the sleeve 5, the latter being keyed to the gear 7, the gears 11, 9 and 7 rotate at the same angular speed; that is, they are temporarily integral in effect. The thrust due to the wedging action is absorbed between a shoulder 35 of the sleeve 5 and a nut 47 affixed at the other end. Hence the stresses due to the wedging action are all taken up by tension in the relatively strong sleeve 5, rather than in the gears 9, 11, 7.

If it be next assumed that the relative rotations between the gears 9 and 11 be reversed, due to a cause which will be explained hereinafter, there will occur an overtaking of the gear 11 by the gear 9. As this occurs, the frictional contact between springs 27 and the intermediate member 23, cause said intermediate member or clutch ring 23 to continue its motion with the gear 9, that is, said clutch ring moves ahead with the gear 9. At the beginning of the action this is also due to the engagement between the convolutions 43, 45, but even after there is disengagement between said convolutions, the frictional drive effects turning of the ring 23. The overtaking action results in the surfaces 19 and 39 temporarily separating and the surfaces 21 and 41 approaching one another until they finally contact. When contact occurs between surfaces 21, 41, the clutch ring 23 rides towards the gear 11 and away from the gear 9, so that the convolutions 43, 45 are separated as indicated (Fig. 9). It will be seen that as said under cut surfaces 21 and 41 engage, there results a positive drawing over of the clutch ring until there is complete complementary engagement between the crown teeth as illustrated in Fig. 9 and complete disengagement between the convolutions 43, 45. Thus the mechanical connection between the gear 9 and the gear 11 is completely broken except for the practically inappreciable frictional drive at the points 25.

It will be understood that if the springs 27 were removed that the function above described would take place, because the oil which is used in the device effects a drag which is equivalent to friction at points 25.

After disconnection has been effected at the convolutions 43, 45, then the gear 9 alone drives the gear 7 by way of its keyed connections at the sleeve 5. The gear 11 then idles with its connected members.

Referring now more particularly to Fig. 1, there is illustrated at numeral 49 an extension from the crank shaft of a suitable prime mover. As above forecast, the prime mover herein primarily considered is of the type in which high or effective torques are delivered only over the higher ranges of speed. Internal combustion engines, turbines of both the steam and gas type, and certain others of which these are but class examples, answer this description.

Fastened to said crank shaft 49 is a magnet spider 51 which, as will be seen hereinafter, functions with the parts thereon to act as flywheel for the engine (if it requires one) and also as a rotating field member.

Figure 2:
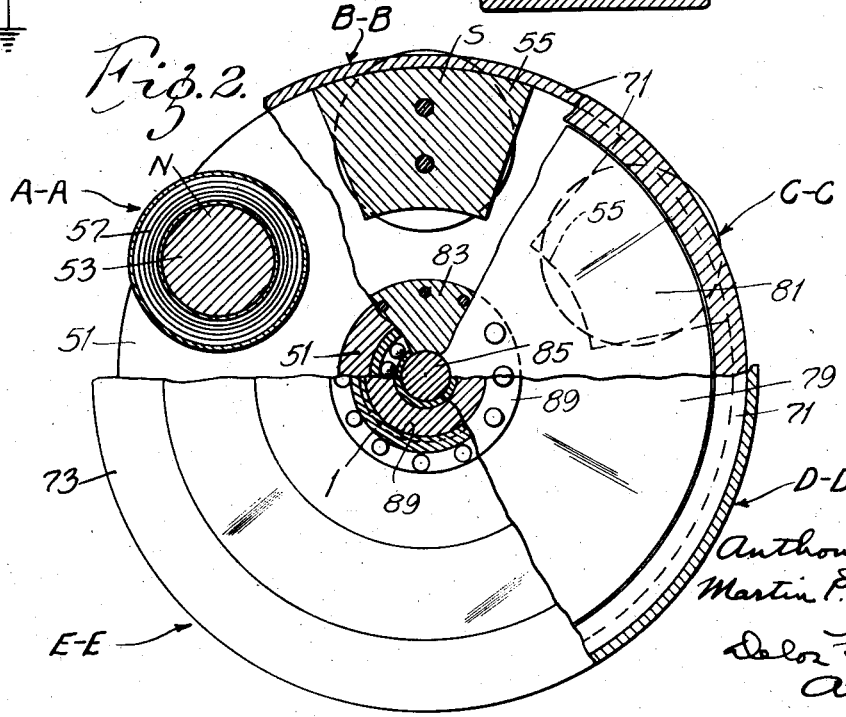
Fig. 2 is a view taken at right angles to Fig. 1 and showing at sectors A—A, B—B, C—C, D—D, and E—E, cross-sections indicated at lines A—A, B—B, C—C, D—D, and E—E, respectively, of Fig. 1.

The field member or magnet 51 carries a plurality of poles 53 having fastened thereto suitable pole faces 55 (see also Fig. 2). Field windings 57 are positioned around the poles 53 and the directions of application to these windings to the respective poles is such that every other pole is a north or positive pole and every other one is a south or negative pole.

The field coils 57 are energized by an exciting shunt generator 59 mechanically driven by the engine of which crankshaft 49 is a part. The driving connection is indicated by the conventional line 61 in Fig. 1. It will be seen that the generator operates at a speed proportional to the speed of the shaft 49. The generator 59 supplies current by way of said line 61, brush 63, collector ring 65 on the spider and line 67 to the windings 57. The other side of the generator is grounded as are the windings 57, see numeral 69. The result of the above construction is that lines of flux emanate from the faces of the north poles and enter the pole faces of the south poles.

In order that the strength of the spider may be increased, a binding ring 71 of non-magnetic or diamagnetic material is fastened around the pole faces 55, thereby preventing the otherwise unbraced ends of the magnet from bending outwardly under action of centrifugal forces. Examples of proper materials are brass, copper, bronze or the like. The purpose of the diamagnetic or non-magnetic property is to maintain a proper direction of magnetic flux.

Fastened to the ring 71 and binding the outside thereof to provide further strength, is a magnetic keeper member 73 of a cross section adapted to carry the magnetic flux engendered by the construction described above. This keeper ring 73 provides an inwardly extending flange 75 opposite the pole faces 55. This flange 75 is spaced a suitable distance from the pole faces and provides a flux gap 77 which is circular in extent and rectangular in cross section.

Positioned within the gap 77 is a pair of non-magnetic, electrically conductive discs 79 and 81. These discs are relatively rotatable with respect to each other and with respect to the rotating field member 51, and they are spaced from one another and from said member a minimum distance which will permit of proper mechanical clearances when relative rotation is effected. The purpose of this minimum clearance is to reduce the magnetic gap as much as possible, and to take advantage of the maximum amount of conductive material which may be put into said gap in the form of inductor discs 79, 81. A suitable material for the discs 79, 81 is copper.

The discs 79, 81 are solid peripherally (Fig. 2). In Fig. 1 their thickness appears to be about equal but this thickness may be unequal under certain conditions, or equal if the character of the material in the two discs is different, so that one will have a greater inductive action than the other. For instance, disc 81 may be the same thickness as disc 79 but comprise a better conductor.

Fig. 10 illustrates how this increased inductor action may be obtained by making the disc 81 thicker than the disc 79, both being composed of the same material, preferably copper. Fig. 10 exaggerates the difference in thickness, for if it were desired to show it in Fig. 1, this could not be done, because of the small scale of the drawing.

The front disc 81 is fastened to a collar 83 which is in turn keyed to a pilot shaft 85 piloted in a portion associated with crankshaft 49 and carrying at its rear end a pinion 87. The pilot shaft 85 is rotatably mounted within a sleeve 89 to which is fastened the rearward disc 79 and to the rearward end of which is fastened or integrally formed a second pinion 91 which is larger than the first pinion 87; that is, it has a larger diameter and more teeth. Suitable thrust collars and washers maintain the relative positions between the parts illustrated and described.

The pinion 87, which will hereinafter be referred to as the first speed pinion, is geared or meshed with the gear 11; and the pinion 91, which will hereinafter be referred to as the second speed pinion, is meshed with the gear 9. The gear 7 is meshed with a driven gear 93 in which is also piloted said pilot shaft 85, the piloting permitting relative movement between the pilot shaft 85 and the driven gear 93. The driven gear 93 is connected with and rotatable with a driven shaft 95 which is connected with the parts to be driven, such as for instance, the running gear of an automobile. The shaft 95 needs to be adapted to overcome any torque at any speed within the limits of operation of the device.

From the above it will be seen that the invention comprises a rotatable magnet having an opening in the ferric circuit for its magnetic flux, in which opening is provided a plurality of separate, closed-circuit inductive conductors which are subjected to the influence of a magnetic flux crossing the opening or gap. In the present invention, two inductors are used, but as will be shown, a greater plurality may be used. Also the present invention shows plain copper discs, but it is to be understood that other forms of inductors may come within the teaching of the invention. The operation of the device is as follows:

The driving engine moves the magnet comprising the magnet poles 53. The lines of flux emanating from and entering the north and south poles respectively, are caused to positively pass through the inductors or electrical driving elements 79 and 81, because of the magnetic properties of the ring 73 and non-magnetic properties of the ring 71. Movement of the magnet poles 53 relatively to the conductor discs 79 and 81 sets up induced electric currents in the discs which in turn react to create a force in the discs sufficient to drive the discs in the direction of movement of the magnet poles. The direction of movement is counterclockwise as indicated by the arrow in Fig. 1 (viewing Fig. 1 from the right).

The force tending to move the discs is a function of the flux passing through them and a function of the current flowing in them. Thus it will be seen that if one disc carries more current than another, and the flux passing through each disc be the same, there will be a difference in the forces tending to turn each disc. Furthermore, the current set up in the respective discs depends upon the electrical impedance in the disc in question, all other conditions remaining the same. It therefore follows that if the relative impedance of the two discs be made such that one impedance is greater than the other, then the disc with the least impedance will exert the greatest driving effort. For example, if the relative impedance of the two discs be indicated by the arbitrary values 70 and 30, respectively, then the current set up in the respective discs will also have a relative inverse value of 70 and 30. The relative impedance is controlled by the means hereinbefore described re disc characteristics.

From the above, it will be seen that if, as is the case in starting the device, the relative movements between either disc and the magnet be a given amount, then with a predetermined flux, and a relative conductivity of 70 and 30 as regards the two discs, the turning effort (due to magnetic drag) exerted by the magnet on the discs will be divided between the discs in the order of 70% and 30%, the 70% effort or torque going to the disc having the greater conductivity, which it is clear, is the disc having the greater thickness or comprising the material permitting greater current flow.

Assuming, as has been done herein, that the disc 81 which is connected with the pinion 87 has the greatest conductivity, then with a given rotation of the magnet 51 it will acquire the greater turning moment. It will transmit this moment through members 83, 85, pinion 87, gear 11, clutch ring or intermediate member 23, gear 9, sleeve 5, gear 7 to gear 93 and the driven member 95. This will provide first speed drive and for the purposes of the present description, the gear speed reduction may be taken at a ratio of 4½ : 1. In this connection attention is called to the fact that as yet the disc 81 is not assumed to be rotating, the load at the driven member 95 at this time not being overcome. That is to say, static conditions of the driven elements are assumed although the magnet is rotating.

While the above functions are taking place, the disc 79 is also having a magnetic drag effective thereon, so that it transmits a turning moment through members 89, pinion 91, gear 9, sleeve 5, gear 7, gear 93 and also to the driven member 95. The gear reduction in this case may be taken at about 1.8 : 1. It will also be appreciated that as yet there is no movement of the member 95 and that, as with the disc 81, static conditions exist.

From the above it will be seen that a turning moment is exerted on the driven member 95 which is obtained from the turning moment exerted by both of the discs 79 and 81. Thus, for convenience, the turning moment of the magnet may be assumed to be 100 pounds feet. Then under the other conditions assumed herein 70% of the 100 pounds feet is absorbed by the high conductive disc 81 and the result will be a turning moment of 70x4½ at the driven member 95, or 315 pounds feet. Inasmuch as the above figures and the others given herein are for descriptive purposes, friction losses have been neglected.

The disc 79 cooperates with the disc 81 to the extent of transmitting 30% of the 100 pounds feet moment or thirty pounds feet of turning effort through the gear ratio of 1.8:1, so that its contribution to the turning moment of the member 95 is 30x1.8 or 54 pounds feet (neglecting friction losses). The sum of the torques, due to the first train of gears from the disc 81 and the torque due to the second train of gears from the disc 79 is 315 pounds feet plus 54 pounds feet which equals 369 pounds feet; or the equivalent of a single gear train having a speed reduction of 3.69 to 1.

Under the above conditions the mechanical or dynamic valve is shut, as shown in Fig. 3, for it will be seen that inasmuch as there is as yet no motion at the driven member 95, if the teeth 15 and 37 are not in wedging relationship, they will become so, because the gear 11 can freely advance until this condition is reached.

Next, the speed of the magnet 51 is increased by accelerating the engine until the applied torque overcomes the resisting torque at the driven member 95. The driven member 95 will under these conditions accelerate and as it does so the disc 79, 81 will accelerate at relative rates with respect to one another which are functions of the gear ratios between the respective discs and the driven member 95. At the same time the prime mover will accelerate until a new balance is struck between the effects of the magnetic flux and the reacting currents in the disc.

As accelerating movement of the driven member 95 takes place, the disc 81 will run faster than the disc 79, because the speed increase from the gear 11 back to pinion 87 is greater than the speed increase from gear 9 to pinion 91. It will thus be seen that the relative movement or slip between the disc 81 and the rotating magnet is less than the relative movement or slip between the disc 79 and the rotating magnet. Furthermore, as noted hereinbefore the turning moment in the disc is a function of the current set up therein and inasmuch as this current is a function of the slip (increasing therewith), the tendency at this time will be for the current flow to decrease in disc 81 and increase in the disc 79.

It also will be appreciated that as the speed of the magnet increases the speed of the generator 59 increases proportionally, inasmuch as there is a mechanical connection between them. Hence there will be an increase in the magnitude of the flux emanating from the magnet as the exciter rotation and output is increased.

The mechanical or dynamic valve on the countershaft 3, throughout the above function, remains engaged or locked, because under the conditions of high torque requirements under starting and accelerating conditions neither one of the discs is capable of assuming the whole load, so that the gear 11 will always be advanced into a locking position of the valve.

As the driven member 95 further accelerates, the prime mover also accelerates (assuming that it is applied to the load with an open throttle), but the slip which is possible between either of the discs 79, 81 and the magnet member 51 will gradually decrease, inasmuch as the generator or exciter 59 automatically increases the flux values in the magnet. The automatic increase is due to the said acceleration of the exciter movement in proportion to the prime mover movement. Thus the rate of prime mover acceleration will not be as great as the rate of acceleration of the driven member 95. This is a desirable feature in automotive practice, as it prevents excessive speeding of the engine.

With the indicated gear ratios, when the prime mover reaches a rotative speed which is approximately 4½ times that of the driven member 95, the first or low speed disc 81 will be rotating at a speed which is substantially synchronous with the prime mover and the magnet, and the disc 79 will be rotating at approximately 40% of the speed of the prime mover. Under these conditions the disc 81 carries and transmits no load and the disc 79 carries all of the load. Furthermore, under these conditions the disc 79 is capable of transmitting all of the turning effort presented by the magnet at a much lower slip than existed at the beginning of the acceleration, because the flux value of the magnet has been considerably increased by the automatic increase in the output of the exciter 59. Also, as the acceleration comes to an end the torque required for continuous driving gradually becomes less.

Beyond the last point reached in the above description, further acceleration of the driven member 95, due to increased flux value in the magnet or a decrease in the load resistance, tends to cause the disc 81 to over-run or turn faster than the magnet.

It will be understood that reference to increased acceleration due to increased flux value regards the effect of these values on the disc 79 which is now carrying all of the load. It will be understood that although the disc 81 is not carrying any of the load at this time, up until the time of complete synchronism or just before that time there is always a slight drag on the disc 81 which is enough to drive the gear 11 at such a speed that the mechanical or dynamic valve remains locked. In other words, the disc 81 and its train of gears are contributing enough torque to keep the valve shut and also to provide a slight driving torque but not enough to be appreciable.

Returning in the description to the condition wherein the disc 81 over-runs, it will be seen that ordinarily such over-running would effect a negative turning moment on the disc 81, were it not for the mechanical or dynamic valve which at this time unlocks. Any negative turning moment on the disc 81 will immediately unlock the dynamic valve, because the speed of gear 11 lags behind that of gear 9, thus drawing out the clutch ring 23 so that disengagement is effected between the convolutions 43—45. With the dynamic valve unlocked and the disc 81 with its attendant gear train disconnected from the remainder of the gear train, the disc 79 is left free to gain velocity. However, the disc 79 cannot reduce its slip while carrying all of the load unless both the prime mover and the driven shaft 95 increase their rotative speed with the attendant increase in flux value in the magnet. This increase in flux value will effect a greater drag on said disc 79 and tend to bring it up to the magnet speed.

Any increase in the relative rotative speed between the prime mover and the driven shaft 95 above the indicated relation of $4\frac{1}{2}:1$, which is the first speed gear train ratio, will cause a positive engagement of the dynamic valve, because the disc 81 then ceases to over-run the magnet and lags behind, so that a positive torque is exerted thereupon. This torque then contributes to the driving effort applied to the driven or load shaft 95, the dynamic valve again locking.

In the foregoing it will be seen that the load it transmitted through the two discs 79, 81 in varying values in relation to each other, ranging from a high percentage of the load carried by and through the disc 81 and the first speed gear train under starting conditions, to a condition after acceleration in which all of the load is carried by and through the disc 79 through the second speed gear train. It is clear that the disc 79 should be designed to carry full load with maximum flux values, the disc 81 being made sufficiently higher in conductivity to arrive at the relative conductivity values required for carrying the relative loads set out hereinbefore.

It will be seen that the accelerating operation is smooth and uninterrupted, because opening of the dynamic valve and the shutting of the same is exceedingly smooth. The transition of the disc 81 from under-run to over-run conditions is gradual and without shock and the same is true with the inverse action. Furthermore, in actual operation, the dynamic valve receives no abuse and is substantially noiseless. The transition from first speed driving to second speed driving per se is exceedingly gradual.

In connection with the design of the magnet, it is preferable that it has a low number of poles, such as 6, as indicated in the drawing and that it has comparatively low relative speeds in respect to the discs. The reason for this is that the current reversals in a given point on either of the discs should be of the order of what is considered in commercial practice to be lower than high frequency, that is, under 80 cycles per second. At such low frequency excessive reaction characteristics of the discs are eliminated or circumvented. If it should become desirable to make use of high frequency phenomena, then the sections of discs should be calculated and conform to the phenomena. It is to be understood that this device can be designed to operate on high frequency phenomena but it is less troublesome to design for the relatively low frequency phenomena.

It is to be understood that this invention is not limited to the use of two speeds or two gear trains effecting two gear ratios from the two inductors, but that any number of gear trains may be used from a corresponding number of inductors, provided a mechanical or dynamic valve of the class described be used whenever an added train is inserted.

It is also to be understood that the exciter 59 may be driven at a rate which is a direct proportion to the rate at which the prime mover moves or suitable speed controlling devices may be used therefor which will affect its output in the manner predetermined to give the best results under particular conditions. Or, the generator may be chosen with such electrical characteristics that the magnetic flux may be varied to suit particular conditions.

From the above, it will be seen that the present device adapts the relatively limited torque-speed range of the prime mover to the relatively unlimited torque-speed range of the given device. The system is therefor especially adapted to translate energy between a prime mover having high torque at high rotative speeds only and a load having a high resistance to motion at low rotative speeds and relatively lower resistance and motion at higher rotative speeds, such as is the case in a motor vehicle. While this device has been referred to hereinbefore as a transmission, which is the term used in the art, it is broadly a translator of energy.

With this translator a characteristic is obtained which is similar to, but an improvement upon, the effect obtained from a direct current series wound motor such as is used in a so-called electric-drive. However, the present invention eliminates the disadvantageous weights and expense incurred in using the generator for translating the mechanical energy of the prime mover into electrical energy to be used in a direct current series wound motor for obtaining similar torque-speed combinations at the load.

The present device effects a high starting effort and a gradual change in torque with increasing rotating speed of the driven member. The driving effort is gradually transferred from a maximum in a low, first gear reduction and from a minimum in a higher high gear reduction to a maximum in the high reduction gear, and to no load in the low, first gear reduction.

The different gear ratios from the respective inductors to the driven member, not only effect the electrically advantageous relative motion between the inductors, but also provide different mechanical advantages.

In view of the above, it will be seen that the several objects of the invention are achieved and other advantageous results attained.

As many changes could be made in carrying out the above constructions without departing from the scope of invention, it is intended that all matter contained in the above description or shown in the accompanying drawings shall be interpreted as illustrative and not in a limiting sense.

We claim:

1. In a power translator, a prime mover, a driven member, a rotatable electro-magnet driven by the prime mover, said magnet having a flux-permeated air gap, a plurality of short-circuited inductors adapted to move in said gap and separate trains of gears connecting each of said inductors to said driven member.

2. A power translator comprising a movable electro-magnet, a driven member, said electro-magnet having a magnetically excited air gap, a plurality of inductors movable in said gap, and separate mechanical connections between the respective inductors and said driven member.

3. A power translator comprising a rotatable electro-magnet, said magnet having a magnetically excited air gap, a plurality of short-circuited inductors adapted to rotate in said air gap, a driven member, separate trains of gears connecting the respective inductors to the driven member and means for variably exciting said magnet to a degree which increases and decreases with its increase and decrease of magnet rotation.

4. A power translator comprising a plurality of rotatable closed-circuit inductors, a common driven member, gear trains of unlike rotative ratios connecting said inductors to said common driven member and to a rotatable magnet having associated magnetic field, said magnet being movable with respect to the inductors and the field thereof cutting said inductors to actuate the same to rotate.

5. A power translator comprising a plurality of rotatable closed-circuit inductors, a common driven member, gear trains of unlike rotative ratios connecting said inductors to said common driven member and a rotatable magnet having associated magnetic field, said magnet being movable with respect to the inductors and the field thereof cutting said inductors to actuate the same to rotate, the inductor connected with the gear train having the greatest speed drop being adapted to carry most of the load initially.

6. A power translator comprising a plurality of rotatable closed-circuit inductors, a common driven member, gear trains of unlike rotative ratios connecting said inductors to said common driven member and a rotatable magnet having associated magnetic field, said magnet being movable with respect to the inductors and the field thereof cutting said inductors to actuate the same to rotate, the inductor connected with the gear train having the greatest speed drop being adapted to carry most of the initial load, and means for automatically transferring the load to the other inductor as the speed of the driven member increases.

7. A power translator comprising a plurality of rotatable closed-circuit inductors, a common driven member, gear trains of unlike rotative ratios connecting said inductors to said common driven member and a rotatable magnet having associated magnetic field, said magnet being movable with respect to the inductors and the field thereof cutting said inductors to actuate the same to rotate, the inductor connected with the gear train having the greatest speed drop being adapted to carry most of the load, and means for automatically transferring the load to the other inductor as the speed of the driven member increases, said last-named means comprising mechanical valving means connecting said trains of gears for locking them together under one predetermined condition of relative movement and for permitting them to move relatively under the reverse condition of relative movement.

8. In a power translator, a driven member, a rotatable driving magnet, a pair of inductors in rotatable inductive relationship with respect to said magnet, geared means connecting with a first one of said inductors with said driven member, a dynamic valve associated with said gear train, a gear train connected with the other inductor, said train having a greater speed drop than the first-named train, said second train driving said driven member by way of said dynamic valve and a portion of the first-named train, said dynamic valve locking under one condition of relative movement between portions of the trains and over-running under reverse conditions of relative movement, the former conditions holding before the first-named inductor reaches synchronism with the magnet and the latter condition holding after synchronism of this inductor has been reached.

9. In a power translator, a driven member, a rotatable driving magnet, a pair of inductors in rotatable inductive relationship with respect to said magnet, geared means connecting with a first one of said inductors with said driven member, a dynamic valve associated with said gear train, a gear train connected with the other inductor, said train having a greater speed drop than the first-named train, said second train driving said driven member by way of said dynamic valve and a portion of the first-named train, said dynamic valve locking under one condition of relative movement between portions of the trains and over-running under reverse conditions of relative movement, the former conditions holding before the first-named inductor reaches synchronism with the magnet and the latter condition holding after synchronism of this inductor has been reached and means for exciting the magnet at a rate which is a function of its speed of rotation.

10. In a power translator, a driven member, a rotatable driving magnet, a pair of inductors in rotatable inductive relationship with respect to said magnet, geared means connecting with a first one of said inductors with said driven member, a dynamic valve associated with said gear train, a gear train connected with the other inductor, said train having a greater speed drop than the first-named train, said second train driving said driven member by way of said dynamic valve and a portion of the first-named train, said dynamic valve locking under one condition of relative movement between portions of the trains and over-running under reverse conditions of relative movement, the former conditions holding before the first-named inductor reaches synchronism with the magnet and the latter condition holding after synchronism of this inductor has been reached, said first-named inductor being adapted to carry the greater part of the driving load when the driven member is first moved from rest.

11. In a power translator, a rotatable magnet, a plurality of inductors in magnetic inductive relationship with respect thereto, said inductors being relatively movable to each other and to the magnet, said inductors having a driving torque engendered therein upon movement of the magnet, a driven member adapted to be accelerated and mechanical means connecting said inductors with the driven member, said mechanical means including means for varying at different rates the relative movement between the inductors and the magnet, whereby one of the magnets reaches synchronism before the other and therefore causes the other to assume the load.

12. In a power translator, a rotatable magnet, a plurality of inductors in magnetic inductive relationship with respect thereto, said inductors being relatively movable to each other and to the magnet, said inductors having a driving torque engendered therein upon movement of the magnet, a driven member adapted to be accelerated and mechanical means connecting said inductors with the driven member, said mechanical means including means for varying at different rates the relative movement between the inductors and the magnet, whereby one of the inductors reaches synchronism before the other and therefore causes the other to assume the load, and means for exciting the magnet to a degree which is a function of the rate of magnet rotation.

13. In a power translator, a rotatable magnet having a magnetic field, inductor discs relatively rotatable in said field and adapted to be driven thereby, said discs having relative movement between themselves, a driven member, means connecting the respective discs with said driven member at varying velocity ratios, whereby as said driven member accelerates, one of the discs will reach synchronism with respect to the magnet before the other, said other disc thereby assuming the load.

14. In a power translator, a rotatable magnet having a magnetic field, inductor discs relatively rotatable in said field and adapted to be driven thereby, said discs having relative movement between themselves, a driven member, means connecting the respective discs with said driven member at varying velocity ratios, whereby as said driven member accelerates, one of the discs will reach synchronism with respect to the magnet before the other, said other disc thereby assuming the load, and means for disconnecting the disc which reaches synchronism after it overruns a condition of synchronism.

15. In a power translator, a plurality of rotatable inductors, rotating magnetic means effecting a magnetic drag on the inductors, driven means, mechanical connections between the respective inductors and said driven means, one of said connections providing a velocity ratio which is different from that of the other.

16. In a power translator, a driven member, a rotatable driving magnet, a pair of inductors in rotatable inductive relationship with respect to said magnet, geared means connecting with a first one of said inductors with said driven member, a dynamic valve associated with said gear train, a gear train connected with the other inductor, said train having a greater speed drop than the first-named train, said second train driving said driven member by way of said dynamic valve and a portion of the first-named train, said dynamic valve locking under one condition of relative movement between portions of the train and over-running under reverse conditions of relative movement, the former conditions holding before the first-named inductor reaches synchronism with the magnet and the latter condition holding after synchronism of this inductor has been reached, said first-named inductor being adapted to carry the greater part of the driving load when the driven member is first moved from rest, said greater part of the drawing load being gradually shifted from the first-named inductor to the other.

In testimony whereof, we have signed our names to this specification this 1st day of November, 1929.

ANTHONY WINTHER.
MARTIN PHILLIP WINTHER.